UNITED STATES PATENT OFFICE.

ALBERT J. ADAMS, OF CLEVELAND, OHIO.

MANUFACTURE OF LINSEED-OIL.

SPECIFICATION forming part of Letters Patent No. 294,425, dated March 4, 1884.

Application filed April 26, 1883. Renewed January 19, 1884. (No specimens.)

*To all whom it may concern:*

Be it known that I, ALBERT J. ADAMS, of Cleveland, county of Cuyahoga, and State of Ohio, have invented a new and useful Improvement in the Manufacture of Linseed-Oil; and I do hereby declare that the following is a full, clear, and exact description of the invention, which will enable others skilled in the art to which it appertains to make and use the same.

The objects of my invention are to save time and labor by reducing the number of grindings of the seed; second, to extract from the seed more completely the oil it contains than do the present processes in use.

To carry my invention into effect I soak or moisten flaxseed in neutral oil—an oil composed of animal, carbon, and a combination of other oils. This neutral oil softens the seed. The oil and flaxseed are then placed in a vat having a coil of pipe in the bottom. The oil is heated to 100° Fahrenheit for five hours by steam passing through the coil of pipe in the vat. The oil is then drained off, the seed removed from the vat, and ground once in the usual manner, by means of stones or otherwise, which leaves the seed in a finely-ground state. This ground seed is then pressed by hydraulic power in the manner commonly employed in the manufacture of linseed-oil, a liquid being pressed out. This liquid is linseed-oil. The produced oil is filtered, the filtered-liquid being linseed-oil of commerce. By the old methods the flaxseed is ground at least three times, and in some processes an offensive odor is given off. In my process no odor is produced save that of linseed-oil itself.

My process saves at least two grindings of the seed, and the seed gives up its oil more completely than by any process now in use.

Having thus described my invention, what I claim as new, and desire to secure by Letters Patent, is—

1. In the manufacture of linseed-oil, the soaking or moistening of flax-seed in neutral oil previous to grinding, substantially as and for the purpose set forth.

2. The herein-described process of extracting linseed-oil from flaxseed by moistening the seed in neutral oil, grinding the moistened seed, and pressing and filtering the oil from the ground seed, substantially as and for the purpose set forth and described.

This specification signed and witnessed this 16th day January, 1883.

ALBERT J. ADAMS.

Witnesses:
GEO. C. TRACY,
A. N. DAVIDSON.